(12) United States Patent
Yamada et al.

(10) Patent No.: US 6,843,268 B2
(45) Date of Patent: Jan. 18, 2005

(54) APPARATUS FOR INHIBITING FUELS FROM FLOWING OUT OF FUEL TANKS

(75) Inventors: Norihiro Yamada, Aichi-ken (JP); Eishin Mori, Aichi-ken (JP); Keisuke Yoshida, Aichi-ken (JP); Koji Miwa, Toyota (JP); Takashi Ishikawa, Okazaki (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 10/640,683

(22) Filed: Aug. 14, 2003

(65) Prior Publication Data

US 2004/0055638 A1 Mar. 25, 2004

(30) Foreign Application Priority Data

Aug. 23, 2002 (JP) ........................................ 2002-243585

(51) Int. Cl.[7] .............................................. F16K 24/04
(52) U.S. Cl. ......................................... 137/202; 137/43
(58) Field of Search ..................................... 137/43, 202

(56) References Cited

U.S. PATENT DOCUMENTS 3,152,604 A * 10/1964 Frye et al. .................. 137/202
5,762,093 A * 6/1998 Whitley, II .................. 137/202
6,708,713 B1 * 3/2004 Gericke ....................... 137/202
2003/0098063 A1 * 5/2003 Mori et al. .................. 137/202

FOREIGN PATENT DOCUMENTS

| JP | A-2-112658 | 4/1990 |
| JP | A-8-105571 | 4/1996 |
| JP | A11-229984 | 8/1996 |

* cited by examiner

Primary Examiner—Gerald A. Michalsky
(74) Attorney, Agent, or Firm—Posz & Bethards, PLC

(57) ABSTRACT

An apparatus is for inhibiting fuels from flowing out of fuel tanks, and includes a housing having an evaporator opening and a fuel opening, a double-floating valve and a cover having a cylinder-shaped liquid receptacle. Alternatively, the apparatus can include a housing having an evaporator opening, a fuel opening and a substantially cylinder-shaped dam, a double-floating valve, and a cover free from the cylinder-shaped liquid receptacle. The apparatus can securely inhibit liquid fuels from flowing into a canister even when liquid fuels spout through the valve hole and the evaporator opening, because liquid fuels collide with the liquid receptacle or the dam to return back into fuel tanks through the evaporator opening.

7 Claims, 4 Drawing Sheets

APPARATUS FOR INHIBITING FUELS FROM FLOWING OUT OF FUEL TANKS

BACKGROUND OF THE INVENTION

1. Field of the Invention

The present invention relates to structural improvements on cut-off valves and means for detecting whether fuel tanks are filled up with fuels, cut-off valves and means which are disposed on automobile fuel tanks.

2. Description of the Related Art

In the vicinity of automobile fuel tanks, a vaporized-fuel circulating system, a so-called evaporator circuit, is disposed. The evaporator circuit leads vaporized fuels from fuel tanks to external canisters. The vaporized fuels are then adsorbed to activated carbon and the like, and are stored temporarily therein. Thus, the evaporator circuit inhibits the pressure increment within fuel tanks, pressure increment which results from the increment of vapor pressure. The canisters are connected with engines, and engines exert an inlet negative pressure to release the adsorbed vaporized fuels from activated carbon to mix them into an air-fuel mixture. Accordingly, the adsorbed vaporized fuels are used again as fuels.

The evaporator circuit is naturally provided with an opening, a so-called evaporator opening, which is formed in fuel tanks. The evaporator opening is generally formed at the uppermost portion of fuel tanks in order to inhibit liquid fuels from flowing into the evaporator circuit. However, when the level of liquid fuels move up and down, there might arise a fear that liquid fuels flow into the evaporator circuit through the evaporator opening. If liquid fuels flow even into the canister, they adsorb onto the activated carbon so that they might impair the usual vaporized fuel-adsorbing action of the activated carbon.

Hence, the evaporator opening has been conventionally provided with a variety of cut-off valves. As for the cut-off valves, floating valves have been often used as described later. When the level of liquid fuels rises abnormally, the floating valves float upward by buoyancy to close the evaporator opening. Consequently, the floating valves inhibit liquid fuels from flowing into the evaporator circuit.

Moreover, fuel tanks are provided with means for detecting whether fuel tanks are filled up with fuels when fuels are supplied. As for the means for detecting filled-up fuel tanks, apparatuses comprising a floating valve have been often used as described later. The floating valve closes an opening of fuel tanks to heighten the pressure within fuel tanks. Thus, fuel supply guns are turned off automatically.

For example, Japanese Unexamined Patent Publication (KOKAI) No. 11-229,984 discloses an apparatus for inhibiting fuels from flowing out. The flow-out fuel inhibitor apparatus is provided with a shut-off valve and a cut-off valve. The shut-off valve lets a gas, which includes a fuel vapor generating in a large volume, flow to a canister when a fuel is supplied. The cut-off valve lets a gas, which includes a fuel vapor, flow to a canister when a fuel is not supplied. The flow-out fuel inhibitor apparatus produces an advantage that the number of component parts and the number of sealed portions can be reduced, because the shut-off valve, operating when a fuel is supplied, and the cut-off valve, operating when a fuel is not supplied, are accommodated in a housing.

However, the above-described flow-out fuel inhibitor apparatus requires two floating valves and two communication passages, respectively, which are disposed parallelly. Accordingly, there arises a problem that it is difficult to design so as to make each of them operate accurately. Moreover, the flow-out fuel inhibitor apparatus suffers from a drawback that the cost involved has gone up, because it requires two floating valves to result in increasing the number of component parts. In addition, the flow-out fuel inhibitor apparatus has a problem with a considerably limited disposition space, because it has an enlarged overall diameter.

Still further, when the above-described flow-out fuel inhibitor apparatus is applied to a variety of fuel tanks whose shape and capacity differ with each other, it is needed to manufacture a diversity of the flow-out fuel inhibitor apparatuses by varying the shapes of housing and float variously. Thus, there arises a drawback that the man-hour requirement for the manufacture has gone up enormously.

Hence, Japanese Unexamined Patent Publication (KOKAI) No. 8-105,571 discloses another apparatus for inhibiting fuels from flowing out. As illustrated in FIG. 6, the flow-out fuel inhibitor apparatus comprises a casing 100, a floating valve 200, a hole 101 with a larger opening area, and a hole 102 with a smaller opening area. The floating valve 200 is disposed in the casing 100. The hole 101 is formed in the bottom of the casing 100. The hole 102 is formed in the top of the casing 100.

The flow-out fuel inhibitor apparatus operates as hereinafter described. When a fuel is supplied, air within a fuel tank 300 is emitted in the following manner as the level of the liquid fuel rises. The air passes through the hole 101 having a larger opening area and hole 102 having a smaller opening area of the casing 100. Then, the air is emitted into a liquid reservoir 105 through an opening 104 by way of a gap 103, into an opened differential-pressure valve 106, into a gap 107, and into a pipe 108 which is connected to a canister and the like. Thereafter, when the hole 101 with a larger opening area is placed below the level of the liquid fuel, the air within the fuel tank 300 is emitted by way of the hole 102 with a smaller opening area alone. However, when the air is emitted through the hole 102 having a smaller opening area only, the air emission is decreased so less that the pressure increases within the fuel tank 300 to actuate a mechanism for turning off a fuel supply gun.

Subsequently, it is possible adjust the level of the liquid fuel to a filled-up liquid-level height "L2" by supplying the fuel with a slow rate which is reduced in accordance with the volume of the air emitted through the hole 102 having a smaller opening area. Moreover, when the level of the liquid fuel exceeds the filled-up liquid-level height "L2," it is possible to inhibit the fuel from entering the pipe 108 which is communicated with the opening 104, because the opening 104, through which the air within the fuel tank 300 is emitted when the fuel is supplied, is closed by the floating valve 200.

However, in the flow-out fuel inhibitor apparatus disclosed in Japanese Unexamined Patent Publication (KOKAI) No. 8-105,571, when the liquid level of the fuel moves up and down violently, there arises a drawback that the floating valve 200 does not respond to it satisfactorily. Specifically, the floating valve 200 is poor in term of the response to the up-and-down motions of the level of liquid fuels, because the mass of the floating valve 200 is large comparatively. Accordingly, there arises a drawback that liquid fuels enter the pipe 108 through the opening 104 to eventually flow to the canister. Moreover, if the floating valve 200 adheres to the opening 104, the floating valve 200 might not move downward even when the level of liquid fuels descends.

Hence, Japanese Unexamined Patent Publication (KOKAI) No. 2-112,658 discloses still another apparatus for inhibiting fuels from flowing out. The apparatus is provided with a double-floating valve. The double-floating valve comprises a lower float, and an upper float. The upper float is held to the top of the lower float so as to be movable up and down relatively, has a minor-diameter valve hole which is opened or closed by the lower float, and closes the evaporator opening. In accordance with the double-floating valve, even when the lower float descends, the upper float keeps to close the evaporator opening for a certain period of time because the upper float has a small mass. In this instance, the valve hole is opened. Thus, the gas within fuel tanks can flow toward the canister through the evaporator opening by way of the valve hole. Moreover, liquid fuels are inhibited from passing the valve hole, because the valve hole has a minor diameter. Accordingly, it is possible to inhibit liquid fuels from entering the canister. Therefore, the response to the up-and-down movements of the level of liquid fuels is improved. In addition, when the lower float moves further downward, accompanied therewith, the upper float moves downward to open the evaporator opening. Consequently, it is possible to inhibit such a drawback that the evaporator opening is kept being closed by the upper float even when the level of liquid fuels descends.

However, even in the flow-out fuel inhibitor apparatus provided with the double-floating valve, liquid fuels might enter the evaporator opening through the valve hole when the level of liquid fuels moves up and down violently. Specifically, liquid fuels might enter the evaporator opening through the valve hole in such a short period of time that the upper float closes the evaporator opening and the lower float moves downward to open the valve hole. If such is the case, a large pressure acts on liquid fuels because the valve hole has a minor diameter. As a result, liquid fuels might spout with great force through the valve hole.

SUMMARY OF THE INVENTION

The present invention has been developed in view of such circumstances. It is therefore an object of the present to provide a flow-out fuel inhibitor apparatus which can securely inhibit liquid fuels which leak through a valve hole of a double-floating valve from flowing toward a canister.

An apparatus according to the present invention is for inhibiting fuels from flowing out of fuel tanks, and can achieve the aforementioned object. The present flow-out fuel inhibitor apparatus comprises:

a housing fixed to a top of a fuel tank, and having an evaporator opening at a top thereof and a fuel opening at a bottom thereof, the evaporator opening communicating with a canister, the fuel opening enabling a liquid fuel held in the fuel tank to enter the housing;

a double-floating valve accommodated in the housing, and comprising a lower float, an upper float and a ring-shaped valve seat, the lower float floating on the liquid fuel and moving up and down in accordance with up-and-down movements of a level of the liquid fuel, the upper float held on a top surface of the lower float so as to be movable up and down relatively with respect to the lower float and having a minor-diameter valve hole opened or closed by the lower float, the valve seat held to a top surface of the upper float and opening or closing the evaporator opening by the up-and-down movements of the upper float accompanied by the up-and-down movements of the lower float; and a cover disposed above the evaporator opening, covering the housing, communicating with the canister, and having a cylinder-shaped liquid receptacle disposed on an inner surface of the cover facing the evaporator opening, protruding toward the evaporator opening and having a diameter larger than an inside diameter of the valve hole, whereby detecting that the fuel tank is filled up with the liquid fuel by increasing a gas pressure within the fuel tank when the level of the liquid fuel within the fuel tank fully closes the fuel opening, and closing the evaporator opening with the valve sheet by moving the double-floating valve upward when the level of the liquid fuel rises abnormally.

Moreover, the evaporator opening, the valve hole and the cylinder-shaped liquid receptacle can desirably be disposed coaxially. In addition, the housing can desirably have a cylinder-shaped liquid reservoir at a top thereof, the liquid reservoir opened under the cylinder-shaped liquid receptacle and communicating with the evaporator opening.

A flow-out fuel inhibitor apparatus according to another aspect of the present invention comprises:

a housing fixed to a top of a fuel tank, and having an evaporator opening at a top thereof, a fuel opening at a bottom thereof and a substantially cylinder-shaped dam, the evaporator opening communicating with a canister, the fuel opening enabling a liquid fuel held in the fuel tank to enter the housing, the cylinder-shaped dam disposed on a top surface of the housing around the evaporator opening and built upward in an upright position;

a double-floating valve accommodated in the housing, and comprising a lower float, an upper float and a ring-shaped valve seat, the lower float floating on the liquid fuel and moving up and down in accordance with up-and-down movements of a level of the liquid fuel, the upper float held on a top surface of the lower float so as to be movable up and down relatively with respect to the lower float and having a minor-diameter valve hole opened or closed by the lower float, the valve seat held to a top surface of the upper float and opening or closing the evaporator opening by the up-and-down movements of the upper float accompanied by the up-and-down movements of the lower float; and a cover disposed above the evaporator opening, covering the housing, and communicating with the canister, whereby detecting that the fuel tank is filled up with the liquid fuel by increasing a gas pressure within the fuel tank when the level of the liquid fuel within the fuel tank fully closes the fuel opening, and closing the evaporator opening with the valve sheet by moving the double-floating valve upward when the level of the liquid fuel rises abnormally.

In the flow-out fuel inhibitor apparatus according to another aspect of the invention, a top surface of the housing can desirably taper from wide to narrow in the direction toward the evaporator opening inside the dam.

Thus, in accordance with the present flow-out fuel inhibitor apparatus, it is possible to securely inhibit the liquid fuel from flowing into the canister even when the liquid fuel spouts through the valve hole and the evaporator opening. Moreover, the liquid receptacle or the dam can be molded integrally with the cover or the housing. Accordingly, the number of component parts does not increase at all.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Figure 1:
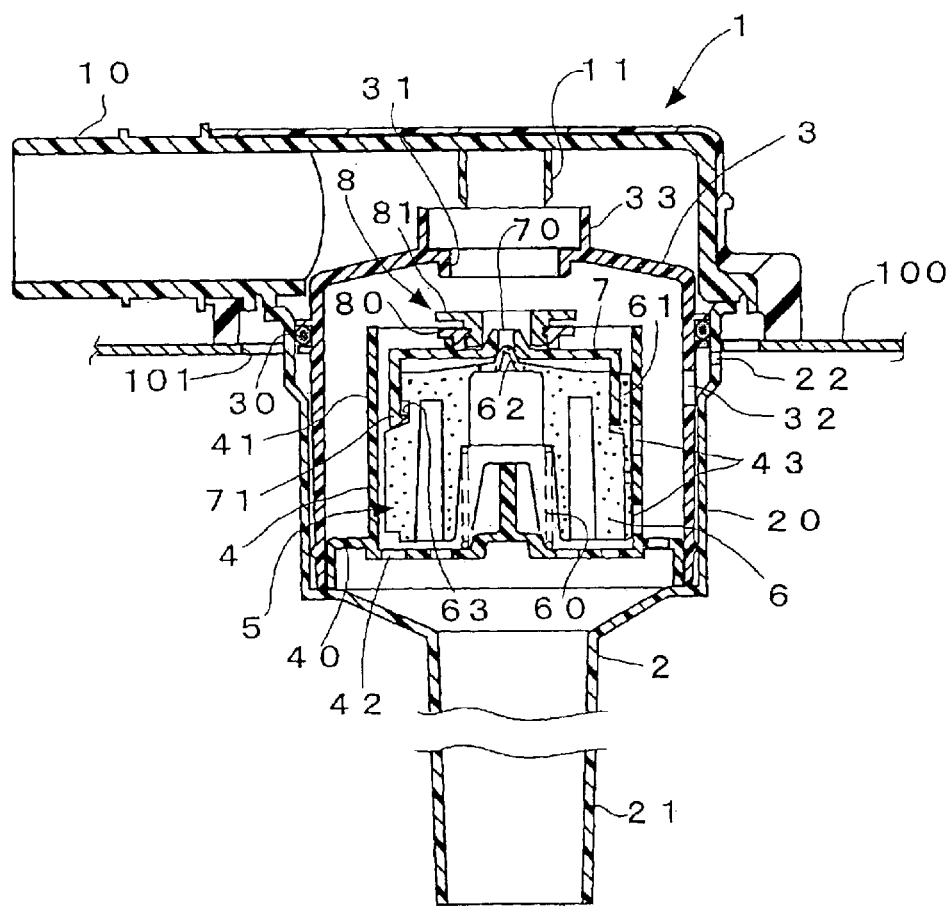
FIG. 1 is a cross-sectional view of a flow-out fuel inhibitor apparatus according to Example No. 1 of the present invention.

Having generally described the present invention, a further understanding can be obtained by reference to the specific preferred embodiments which are provided herein for the purpose of illustration only and not intended to limit the scope of the appended claims.

In accordance with the present flow-out fuel inhibitor apparatus, the double-floating valve is held within the housing by its own weight in the same manner as the conventional flow-out fuel inhibitor apparatus when the level of the liquid fuel is placed below the fuel opening under normal operating circumstances and fuel supply circumstances. Accordingly, the evaporator opening is opened. Therefore, the gas within the fuel tank passes the housing through the fuel opening of the housing, and flows into the canister through the evaporator opening. Thus, the gas pressure within the fuel tank can be adjusted.

After the level of the liquid fuel within the fuel tank rises to arrive at the opening position of the fuel opening under fuel supply circumstances, a large differential pressure arises between the vapor phase within the fuel tank and the vapor phase within the housing because the ventilation resistance is exerted greatly to the gas passing the housing. Accordingly, the level of the liquid fuel within the housing is placed higher than the level of the liquid fuel within the fuel tank. Thus, the double-floating valve ascends so that the valve seat closes the evaporator opening, thereby shutting off the ventilation of the vaporized gas. Consequently, the pressure within the fuel tank increases instantaneously so that the present flow-out fuel inhibitor apparatus can promote to automatically turn off fuel supply guns. Specifically, in accordance with the present flow-out fuel inhibitor apparatus, it is possible to detect whether the fuel tank is filled up with the liquid fuel by means of the fuel opening. As a result, it is possible to adjust the level of the liquid fuel which tells the position for detecting filled-up fuel tanks by simply adjusting the position of the fuel opening or adjusting the opening shape thereof.

On the other hand, when the level of the liquid fuel rises abnormally to float the double-floating valve upward upon accelerating or rolling over vehicle in driving, the double-floating valve is pressed onto the evaporator opening by the buoyant force so that the evaporator opening is closed to disconnect the fuel tank with the canister. Moreover, the valve hole of the upper float is closed by the lower float. Thus, the liquid fuel is inhibited from entering the evaporator opening and then flowing into the canister. Hence, the double-floating valve serves as a cut-off valve.

Moreover, when the level of the liquid fuel moves up and down violently upon accelerating or rolling over vehicle in driving, the valve seat keeps closing the evaporator opening for a certain period of time even after the lower float descends because the upper float has a small mass. In this instance, the valve hole is opened. Accordingly, it is possible for gases within the fuel tank to flow toward the canister through the evaporator opening by way of the valve hole. However, the liquid fuel is inhibited from passing the valve hole because the valve hole has a minor diameter. Consequently, it is possible to inhibit the liquid fuel from flowing into the canister.

However, when the level of the liquid fuel moves up and down violently, the liquid fuel might enter the evaporator opening through the valve hole in a short period of time while the valve seat closes the evaporator opening and the lower float descends to open the valve hole. Moreover, the liquid fuel might be subjected to the action of large pressures to spout with force through the valve hole because the valve hole has a minor diameter.

Hence, in accordance with the present flow-out fuel inhibitor apparatus, the cover has the cylinder-shaped liquid receptacle. The cylinder-shaped liquid receptacle is disposed on an inner surface of the cover facing the evaporator opening, protrudes toward the evaporator opening, and has a diameter larger than an inside diameter of the valve hole. Accordingly, the liquid fuel, which passes the evaporator opening through the valve hole to spout, collides with the cylinder-shaped liquid receptacle, is led by a peripheral wall of the liquid receptacle to fall downward, and is returned into the fuel tank through the evaporator opening. Consequently, it is possible to inhibit the liquid fuel from flowing into the canister.

Moreover, in accordance with another aspect of the present flow-out fuel inhibitor apparatus, the housing has the dam. The dam is disposed on a top surface of the housing around the evaporator opening, and is built upward in an upright position. Accordingly, the liquid fuel, which enters the evaporator opening through the valve hole, is dammed by the dam. Accordingly, it is possible to inhibit the liquid fuel from flowing into the canister. The liquid fuel reserved at the dam evaporates to turn into gases, and flows into the canister.

The housing can be disposed integrally with the fuel tank, or can be disposed independently of the fuel tank. Further, the housing can be disposed within the fuel tank where the vapor phase of the fuel exists, or can be disposed so as to penetrate a top wall of the fuel tank. Furthermore, the method of fixing the housing to the fuel tank is not limited in particular, for example, the housing can be fastened to the fuel tank by means of welding or bolt, or the housing can be formed integrally with the fuel tank. The evaporator opening communicating with the canister is positioned at the uppermost portion of the housing in general. However, the position of the evaporator opening is not limited in particular, as far as the evaporator opening is placed where the double-floating valve can close the evaporator opening when the double-floating valve ascends by buoyancy.

The fuel opening of the housing can be formed as a bottom-end opening of a cylinder which extends downward from the housing. If such is the case, the length of the cylinder can be designed so that the bottom-end opening is placed at the liquid level of the liquid fuel when the fuel tank is filled up with the liquid fuel. Therefore, depending on the capacity and shape of fuel tanks, the length of the cylinder varies diversely. However, it is possible to detect whether fuel tanks are filled up with liquid fuels by simply adjusting the length of the cylinder. For example, when the cylinder is formed to have a maximum length, it is possible to determine a position at which fuel tanks are filled up with liquid fuels by simply cutting the cylinder to a desired length according to the type of vehicles. Accordingly, it is not required to manufacture a variety of flow-out fuel inhibitor apparatuses according to fuel tanks. Consequently, it is possible to sharply reduce the cost involved in manufacturing fuel tanks. Moreover, when the cylinder and the housing are formed independently, it is suffice to prepare a plurality of the cylinders having a desired length alone.

The cylinder can be fastened to a bottom of the housing. Alternatively, a top end of the cylinder can be shared by a peripheral wall of the housing. The cylinder can desirably have a smaller diameter at the bottom-end opening at least than the diameter of the housing. With such an arrangement, it is possible to accurately detect whether the fuel tank is filled up with the liquid fuel when the level of the liquid fuel waves in supplying the liquid fuel.

Moreover, the fuel opening of the housing can be formed as a major-diameter major through hole which is formed in a lower side surface of the housing and is formed as a shape whose opening width sharply reduces from wide to narrow in the direction from a bottom end thereof to a top end thereof. If such is the case, the major through hole is positioned so that the top end can be disposed adjacent to a position where the level of the liquid fuel is placed when the fuel tank is filled up with the liquid fuel. With such an arrangement, it is possible to detect whether the fuel tank is filled up with the liquid fuel by simply adjusting the position of the top end of the major through hole or adjusting the opening shape thereof. Therefore, when the major through hole is left for post processing in which it is pierced in a lower side surface of the housing, the present flow-out fuel inhibitor apparatus can offer special convenience because it can be shared by a variety of fuel tanks. For example, the major through hole can preferably be formed as a substantially triangular shape whose base length "l" and height "h"; and the ratio of "l" with respect to "h" can preferably fall in a range of from more than 1 (not inclusive) to less than 3 (not inclusive), i.e., 1<"l"/"h"<3, further preferably from more than 1 (not inclusive) to less than 2 (not inclusive), i.e., 1<"l"/"h"<2. In this instance, it is furthermore preferred that a side of the substantially triangular shape can be formed as an arc whose radius is from 5 to 50 mm, further preferably from 10 to 40 mm, furthermore preferably from 10 to 30 mm.

The double-floating valve comprises the lower float, the upper float, and the valve seat. The lower float can be made from the same materials as conventional floating valves are made from, and can be formed as the same shapes as they are formed. Moreover, the double-floating valve can float upward by the difference between its specific gravity and the gravity of liquid fuels alone. Alternatively, the double-floating valve can use the urging force of urging means, such as springs, as an aid for the buoyancy.

The upper float is held to the lower float so as to be movable up and down relatively with respect to the lower float. The upper float is required to have an engagement portion which engages with the lower float so that it descends together with the lower float when the lower float descends. Moreover, the valve hole of the upper float is formed so that it can be closed by the lower float in a liquid proof manner. The diameter of the valve hole can desirably be $\phi$ 3 mm or less, and can further desirably fall in a range of from $\phi$ 1 to 3 mm, furthermore desirably from $\phi$ 1.5 to 2.5 mm. When the diameter of the valve hole exceeds $\phi$ 3 mm, it is not preferable because the liquid fuel is likely to flow into the evaporator opening through the valve hole.

The valve seat can seal the evaporator opening in a liquid proof manner, and is held to a top surface of the upper float. The valve seat can be disposed independently of the upper float. Alternatively, a part of the upper float can be formed as the valve seat.

The cylinder-shaped liquid receptacle protrudes toward the evaporator opening, and has a diameter larger than an inside diameter of the valve hole. The liquid receptacle receives the liquid fuel which spouts through the evaporator opening. The liquid receptacle can be formed integrally with the cover. As far as a gap in which gases can pass is formed between the liquid receptacle and the housing, the higher height the liquid receptacle has, the more likely it is to inhibit the liquid fuel from flowing toward the canister. Moreover, it is satisfactory that the liquid receptacle has a diameter larger than the inside diameter of the valve hole. However, the diameter of the liquid receptacle can further desirably be larger than the diameter of the evaporator opening.

The evaporator opening, the valve hole and the cylinder-shaped liquid receptacle can desirably be disposed coaxially. With such an arrangement, it is possible to efficiently receive the liquid which spouts with force through the minor-diameter valve hole by the cylinder-shaped liquid receptacle. As a result, it is possible to more reliably inhibit the liquid fuel from flowing toward the canister.

Moreover, the housing can desirably have a cylinder-shaped liquid reservoir at a top thereof. With the liquid reservoir, it is possible to much more reliably inhibit the liquid fuel from flowing toward the canister.

The cylinder-shaped dam is disposed on a top surface of the housing around the evaporator opening, and is built upward in an upright position. The cylinder-shaped dam dams the liquid fuel which spouts through the evaporator opening and collides with the cover to bounce back. Moreover, the dam reserves the liquid fuel to inhibit the liquid fuel from flowing toward the canister. Similarly to the cylinder-shaped liquid receptacle, as far as a gap in which gases can pass is formed between the dam and the cover, the dam has a height as high as possible. Moreover, the dam can preferably have a diameter larger than the diameter of the above-described liquid reservoir. When the diameter of the dam is smaller than the diameter of the liquid reservoir, the liquid fuel, which collides with the cover to bounce back, might fall outside the dam to flow into the canister. Accordingly, the diameter of the dam can preferably be as large as possible, and can further preferably be substantially equal to the outside diameter of the housing. In addition, the dam can preferably have a reduced height partially in order to let vaporized fuels pass smoothly. Specifically, as described in one of the following examples of the present flow-out fuel inhibitor apparatus, the dam can be dented at a portion thereof facing a nipple.

The liquid fuel reserved at the dam evaporates to turn into gases, and flows into the canister to disappear of itself. However, when the liquid fuel is reserved at the dam in a large volume, it might overflow out of the dam. Hence, the upper surface of the housing can preferably taper from wide to narrow in the direction toward the evaporator opening inside the dam. With such an arrangement, the liquid fuel, which is reserved at the dam, flows toward the evaporator opening, and is returned back into the fuel tank through the evaporator opening. Accordingly, there arises no drawback that the liquid fuel overflows out of the dam.

Even when the present flow-out fuel inhibitor apparatus is provided with the liquid receptacle or the dam alone, it can produce the advantages. However, it can preferably be provided with both of the liquid receptacle and the dam.

Moreover, the double-floating valve can desirably be provided with a cylinder formed on an outer periphery thereof, opened upward and disposed within the housing. When the double-floating valve is provided with such a cylinder, the cylinder contacts in-coming liquid fuels to restrict the flow of liquid fuels. Accordingly, it is possible to inhibit liquid fuels from coming into the evaporator opening. Consequently, it is possible to further restrict the flow of in-coming liquid fuels. The cylinder can preferably have such a height that it is disposed to protrude beyond the top surface of the double-floating valve when the double-floating valve is placed at the lowermost position under normal operating circumstances.

EXAMPLES

The present invention will be hereinafter described in more detail with reference to specific embodiments.

Example No. 1

FIG. 1 illustrates a cross-sectional view of a flow-out fuel inhibitor apparatus according to Example No. 1 of the present invention. The flow-out fuel inhibitor apparatus comprises a cover 1, a cylinder-shaped body 2, an upper case 3, a lower case 4, and a double-floating valve 5. The cover 1 is fixed to the top of an opening 101 by welding. The opening 101 is formed in the top surface of an automobile gasoline tank 100 made from resin. The cylinder-shaped body 2 is fixed to the bottom surface of the cover 1 by welding. The upper case 3 is held by engagement in the cylinder-shaped body 2. The lower case 4 is held in the upper case 3. The double-floating valve 5 is disposed movably in the vertical direction in the upper case 3 and lower case 4.

The cylinder-shaped body 2 is formed of polyamide resin by injection molding, and is molded as a 2-stage construction. The 2-stage construction comprises a major-diameter portion 20, and a minor-diameter portion 21. Note that the end surface of the major-diameter portion 20 is fixed to the bottom surface of the cover 1 by welding to make a housing. The minor-diameter portion 21 extends substantially vertically into the gasoline tank 100. Note that the minor-diameter portion 21 has such a length that the bottom-end opening (i.e., a fuel opening) is placed at the liquid level of a liquid fuel when the fuel tank 100 is filled up with the liquid fuel. Moreover, in the side wall of the major-diameter portion 20, minor-diameter through holes 22 are formed at equal intervals. Thus, the inside of the cylinder-shaped body 2 is communicated with the vapor phase within the gasoline tank 100 by the minor-diameter through holes 22.

The minor-diameter through holes 22 formed in the major-diameter portion 20 communicates the inside of the fuel tank 100 with the inside of the cylinder-shaped body 2. It is important to appropriately design the diameter and quantity of the minor-diameter through holes 22. When the diameter of the minor-diameter through holes 22 is too large, or when the quantity of the minor-diameter through holes 22 is too much, it is difficult to increase the inner pressure within the fuel tank 100 when the fuel tank 100 is filled up with the liquid fuel. Accordingly, it is difficult to automatically turn off fuel supply guns. On the other hand, when the diameter of the minor-diameter through holes 22 is too small, or when the quantity of the minor-diameter through holes 22 is too less, it is difficult to distribute gases within the fuel tank 100 to a canister. Consequently, it is difficult to flow the gas within fuel tank 100 to the canister when fuel tanks are filled up with the liquid fuel. As a result, a drawback might arise to adversely affect when the double-floating valve 5 serves as a cut-off valve to adjust the inner pressure within the fuel tank 100. Therefore, it is necessary to determine the diameter and quantity of the minor-diameter through holes 22 by trial and error but precisely depending on the capacity of the fuel tank 100. For example, the diameter of the minor-diameter through holes 22 can preferably be from 0.5 to 3.0 mm, further preferably from 1.0 to 2.0 mm. Note that it is desirable to dispose the minor-diameter through holes 22 as close as possible to the top surface of the fuel tank 100 in order to inhibit the liquid fuel from entering the cylinder-shaped body 2.

The upper case 3 and the lower case 4 are held in the major-diameter portion 20 of the cylinder-shaped body 2. The upper case 3 is formed as an inverted mug shape. The lower case 4 is fixed by engagement on the bottom-end opening of the upper case 3. The upper case 3 contacts with the shoulder of the cylinder-shaped body 2 at the bottom end, and also contacts with the major-diameter portion 20 of the cylinder-shaped body 2 at the outer peripheral surface by way of an O-ring 30 in an air proof manner. Thus, the upper case 3 is held in and fixed to the cylinder-shaped body 2. Further, an evaporator opening 31 communicating with the cover 1 is formed in the uppermost portion of the upper case 3. Furthermore, communication holes 32 communicating the inside of the upper case 3 with the outside are formed in the peripheral wall of the upper case 3 at positions under the O-ring 30 disposed around the outer peripheral surface of the upper case 3 and facing the minor-diameter through holes 22. Moreover, a cylinder-shaped liquid reservoir 33 is formed on the top surface of the upper case 3 around the evaporator opening 31, and is built upward in an upright position.

The lower case 4 includes an end plate 40, and a cylinder 41. The end plate 40 is fixed by engagement in the bottom-end opening of the upper case 3. The cylinder 41 projects upward from the end plate 40. In the end plate 40, a plurality of communication holes 42 are formed to pierce the top and bottom surfaces of the end plate 40. In the cylinder 40, a plurality of communication holes 43 are formed to communicate the inside of the cylinder 40 with the outside.

The double-floating valve 5 comprises a lower float 6, an upper float 7, and a valve seat 8. The lower float 6 is placed by way of a spring 60 on the top surface of the end plate 40. On the outer peripheral surface of the lower float 6, a plurality of ribs 61 extending in the vertical direction are formed. The lower float 6 can move in the vertical direction within the cylinder 41 while the ribs 61 are brought into contact with and guided on the inner peripheral surface of the cylinder 41. Moreover, at the top of the lower float 6, a sealing protrusion 62 is formed. In addition, around the top of the lower float 6, the upper float 7 is held relatively movably in the vertical direction. The upper float 7 is formed as a cylinder shape bottomed at the top or an inverted cup shape. In the middle of the upper float 7, a through valve hole 70 is formed to face the sealing protrusion 62. The through valve hole 70 can preferably have a diameter of from $\phi$ 1 to 3 mm, further preferably from $\phi$ 1.5 to 2.5 mm.

The upper float 7 is disposed so as to face the bottom end upward, and is held to the lower float 6. On the outer peripheral surface of the lower float 6, a plurality of engagement grooves 63 are formed, and engage with claws 71 which are formed on the opening end of the upper float 7. The engagement grooves 63 are formed vertically longer than the claws 71. Accordingly, the upper float 7 can move slightly relatively in the vertical direction with respect to the lower float 6. When the lower float 6 and upper float 7 move relatively in the direction approaching to each other, the sealing protrusion 62 of the lower float 6 closes the valve hole 70 to seal the valve hole 70.

The lower float 6 and upper float 7 are formed of polyoxymethylene (POM) resin. The shapes and apparent specific gravities of the lower float 6 and upper float 7 are designed so that their apparent specific gravities are smaller than that of gasoline in order that the lower float 6 and upper float 7 can float on liquid gasoline by the urging force of the spring 60. The spring 60 is held between the bottom end of the lower float 6 and the end plate 40 of the lower case 4 in such a state that the spring 60 accumulates the urging force. However, the urging force is smaller than the sum of the weights of the lower float 6, upper float 7 and valve seat 8. Accordingly, in air and gasoline vapor, the lower float 6 presses the spring 60 by its own weight so that the bottom-end surface of the lower float 6 contacts with the end plate 40 of the lower case 4.

The valve seat 8 includes a ring-shaped base 80, and a valve body 81. On the top surface of the upper float 7, the base 80 is fixed by welding. The base 80 is fixed by engagement to the valve body 81 made from rubber. When the upper float 7 ascends as the lower float 6 ascends, the valve body 81 contacts with the bottom-end surface of the evaporator opening 31 to seal the evaporator opening 31.

The cover 1 is formed of polyethylene resin and polyamide resin by 2-color injection molding. The outside resinous layer is fixed by welding to the surface of the gasoline tank 100. The cover 1 is provided with a nipple 10. The nipple 10 protrudes parallel to the top surface of the gasoline tank 100, and is fitted into a tube which is connected with a canister. Moreover, a cylinder-shaped liquid receptacle 11 is formed on the inner surface of the cover 1, inner surface which faces the evaporator opening 31. The liquid receptacle 11 protrudes toward the evaporator opening 31, and has an inside diameter which is larger than the inside diameter of the valve hole 70 and which is smaller than the inside diameter of the liquid reservoir 33. Note that the liquid receptacle 11, the evaporator opening 31, the liquid reservoir 33 and the valve hole 70 are disposed coaxially.

In the thus constructed flow-out fuel inhibitor apparatus according to Example No. 1, the total weight of the double-floating valve 5, i.e., the summed weight of the lower float 6, upper float 7 and valve seat 8, overcomes the urging force of the spring 60 when the level of the liquid gasoline is below the lower float 6 under steady ordinary circumstances. Accordingly, a clearance is formed between the valve body 81 and the bottom-end surface of the evaporator opening 31. Therefore, the gas within the gasoline tank 100 passes the communication holes 32, 42 and 43 through the through holes 22 or the bottom-end opening of the cylinder-shaped body 2 to enter the upper case 3. Then, the gas passes the nipple 20 through the evaporator opening 31, and flows into the canister. Thus, it is possible to inhibit the gas pressure within the gasoline tank 100 from heightening.

On the other hand, when vehicles travel on roads with large irregularities, or when they travel on curved roads, the level of the liquid gasoline waves greatly. Accordingly, even if the level of the liquid gasoline is placed below positions at which the double-floating valve 5 floats under steady circumstances, the liquid gasoline might enter the cylinder-shaped body 2 through the bottom-end opening of the cylinder-shaped body 2 or the minor-diameter through holes 22. However, in the flow-out fuel inhibitor apparatus according to Example No. 1, the lower float 6 and upper float 7 float upward by the liquid gasoline in such an instance. Consequently, the valve body 81 closes the evaporator opening 31. As a result, it is possible to inhibit the liquid gasoline from flowing into the canister. Moreover, even if the valve body 81 adheres to the evaporator opening 31, the lower float 6 descends so that the upper float 7 detaches from the lower float 6 to separate the sealing protrusion 62 from the valve hole 70 when the level of the liquid gasoline descends. Accordingly, the pressure within the cylinder-shaped body 2 is equalized with the pressure on the side of the nipple 20 communicating with the canister. Consequently, the valve body 81 separates from the evaporator opening 31 with ease. As a result, the flow-out fuel inhibitor apparatus according to Example No. 1 is highly responsive when the level of the liquid gasoline waves greatly, and is good in terms of the dynamic sealing property.

Moreover, in supplying the gasoline, when the level of the liquid gasoline within the gasoline tank 100 is placed below the bottom-end opening of the cylinder-shaped body 2, the gas existing in the vapor phase within the gasoline tank 100 flows into the cylinder-shaped body 2 through the bottom-end opening of the cylinder-shaped body 2 to flow toward the canister as the level of the liquid gasoline ascends. Accordingly, it is possible to keep supplying the gasoline without increasing the pressure within the gasoline tank 100.

In addition, in supplying the gasoline, when the level of the liquid gasoline reaches the end surface of the bottom-end opening of the cylinder-shaped body 2, the gas existing in the vapor phase within the gasoline tank 100 flows into the cylinder-shaped body 2 through the through holes 22 alone. Note that the through holes 22 are formed to have such a minor diameter that they exhibit a large ventilation resistance inherently. Therefore, a differential pressure arises between the vapor phase within the gasoline tank 100 and the vapor phase within the cylinder-shaped body 2 to ascend the level of the liquid gasoline within the cylinder-shaped body 2. Accordingly, the double-floating valve 5 floats upward so that the valve body 81 closes the evaporator opening 31 to shut off the ventilation. Consequently, the pressure within the gasoline tank 100 heightens at once. As a result, the gasoline tank 100 is detected that it is filled up with the gasoline. Thus, it is possible to promote to automatically turn off fuel supply guns.

When the level of the liquid gasoline moves up and down violently, the liquid gasoline might flow out through the evaporator opening 31. Moreover, the liquid gasoline might rise abruptly in the cylinder-shaped body 2 to move the lower float 6 upward. In this instance, the liquid gasoline, which is reserved between the lower float 6 and the upper float 7, might spout through the valve hole 70. If such is the case, the liquid gasoline, which spouts through the evaporator opening 31, collides with the cover 1 within the cylinder-shaped liquid receptacle 11, and is led by the liquid receptacle 11 to fall in the liquid reservoir 33. Accordingly, it is possible to inhibit the liquid gasoline from coming into the nipple 10. The liquid gasoline, which has fallen in the liquid reservoir 33, falls through the evaporator opening 31 when the evaporator opening 31 is not closed, and is returned back into the gasoline tank 100.

The flow-out fuel inhibitor apparatus according to Example No. 1 is manufactured in the following manner, for instance. The double-floating valve 5 is first assembled. The assembled double-floating valve 5 is accommodated in the cylinder 41 of the lower case 4. Then, the upper case 3 and lower case 4 are fastened by engagement, and are fastened to the major-diameter portion 20 of the cylinder-shaped body 2 by way of the O-ring 30 by engagement. Thereafter, the opening end of the major-diameter portion 20 is fastened to the cover 1 by welding. The resulting module is fitted into the opening 101 of the gasoline tank 100. Finally, the cover 1 is welded to the periphery of the opening 101 of the gasoline tank 100.

Therefore, even when the gasoline tank 100 is formed as a variety of shapes or is formed to have a variety of capacities, it is possible to adjust the detecting position at which the gasoline tank 100 is detected to be filled up with gasoline by simply adjusting the length of the cylinder-shaped body 2. Moreover, a variety of gasoline tanks can share the component parts of the flow-out fuel inhibitor apparatus according to Example No. 1 except the cylinder-shaped body 2. Accordingly, it is possible to remarkably reduce the cost involved in manufacturing gasoline tanks. In addition, the flow-out fuel inhibitor apparatus requires a less boarding space and offers a high degree of freedom when it is disposed in vehicles, because it can be fastened by welding to a portion of the gasoline tank 100 with an extremely small area.

Example No. 2

Figure 2:
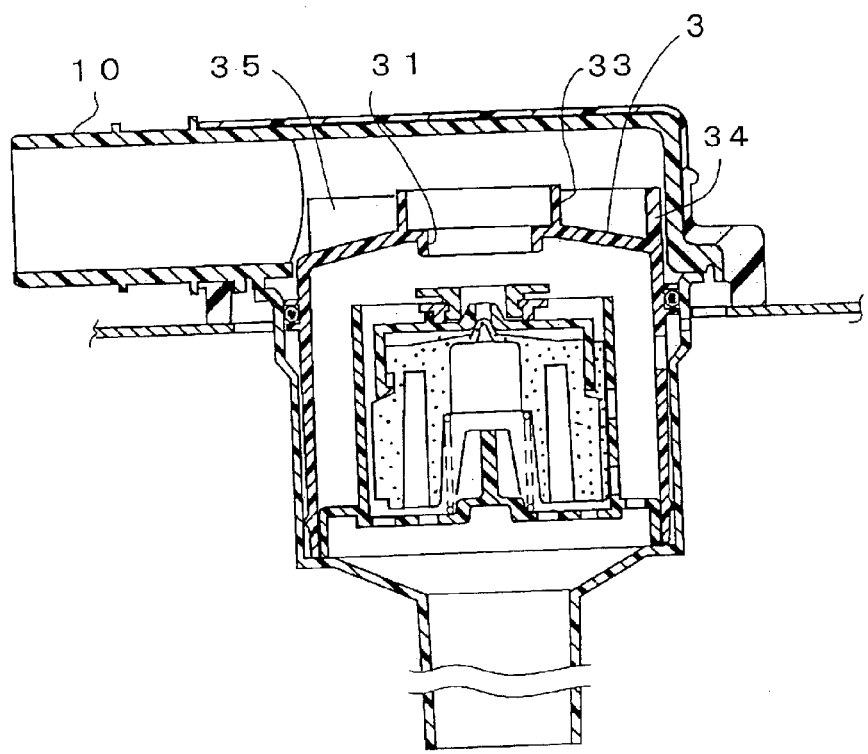
FIG. 2 is a cross-sectional view of a flow-out fuel inhibitor apparatus according to Example No. 2 of the present invention.

FIG. 2 illustrates a flow-out fuel inhibitor apparatus according to Example No. 2 of the present invention. Except that the cover 1 is not provided with the cylinder-shaped liquid receptacle 11 and the upper case 3 is formed as a different shape, the flow-out fuel inhibitor apparatus according to Example No. 2 is constructed in the same manner as Example No. 1.

A cylinder-shaped liquid reservoir 33 is disposed on the top surface of the upper case 3 around the evaporator opening 31, and is built upward in an upright position in the same manner as Example No. 1. Moreover, around the outer periphery of the liquid reservoir 33, a dam 34 is formed coaxially with the evaporator opening 31. Note that the dam 34 has a height lower than that of the liquid reservoir 33. Except these arrangements, the upper case 3 of the flow-out fuel inhibitor apparatus according to Example No. 2 is constructed in the same manner as Example No. 1.

Figure 3:
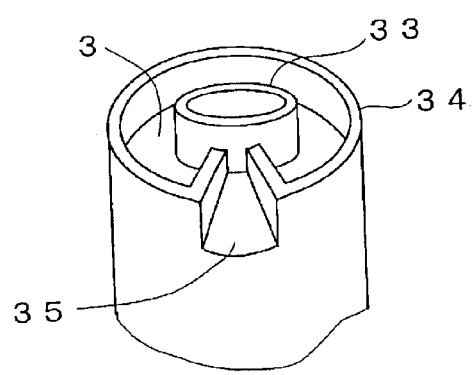
FIG. 3 is a major perspective of the flow-out fuel inhibitor apparatus according to Example No. 2.

As illustrated in FIG. 3, most of the dam 34 is formed as a cylinder shape. However, the dam 34 is bent inward at a portion of the peripheral wall where it faces the nipple 10. Accordingly, the peripheral wall of the dam 34 is connected with the outer peripheral surface of the liquid reservoir 33. Thus, a dent 35 is formed at the portion of the dam 34 which faces the nipple 10. As can be seen from FIG. 2, the dent 35 inhibits the dam 34 from interfering with the opening of the cover 1 which communicates with the nipple 10. Consequently, it is possible to inhibit the ventilation resistance from enlarging.

In the flow-out fuel inhibitor apparatus according to Example No. 2, the liquid gasoline spouting through the evaporator opening 31 collides with the cover 1 to fall in the dam 34 or the liquid reservoir 33. Accordingly, it is possible to inhibit the liquid gasoline from coming into the nipple 10. Moreover, the liquid gasoline fallen in the dam 34 is reserved in the dam 34, and evaporates to turn into gases. The resulting gases flow toward the nipple 10 eventually. Consequently, it is possible to inhibit the liquid gasoline from flowing into the canister.

Example No. 3

Figure 4:
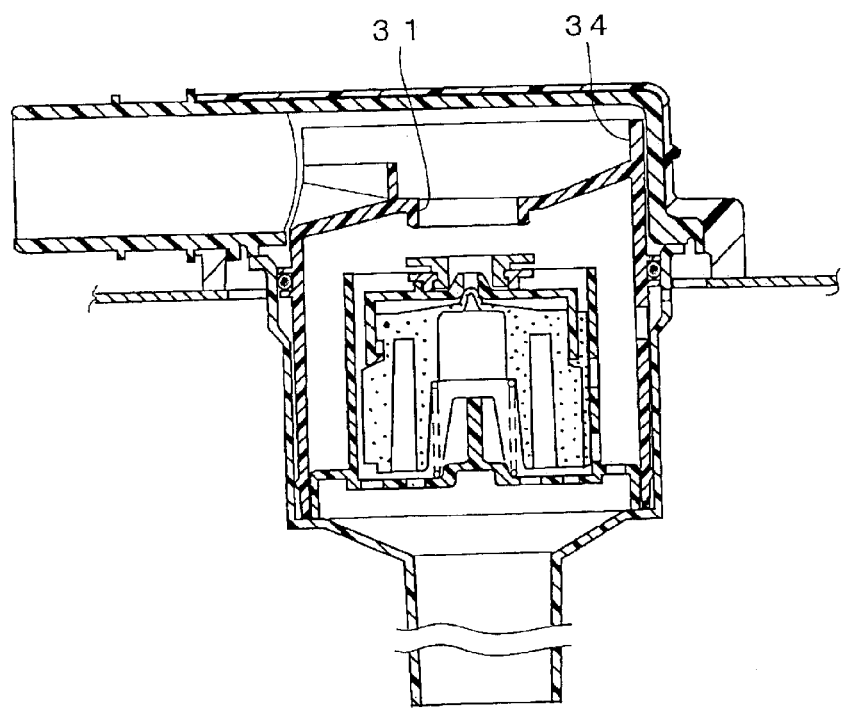
FIG. 4 is a cross-sectional view of a flow-out fuel inhibitor apparatus according to Example No. 3 of the present invention.

FIG. 4 illustrates a flow-out fuel inhibitor apparatus according to Example No. 3 of the present invention. Except that the cover 1 is not provided with the cylinder-shaped liquid receptacle 11 and the top surface of the upper case 3 is formed as a different shape, the flow-out fuel inhibitor apparatus according to Example No. 3 is constructed in the same manner as Example No. 1.

Figure 5:
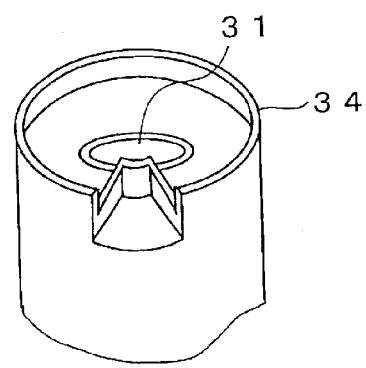
FIG. 5 is a major perspective view of the flow-out fuel inhibitor apparatus according to Example No. 3.
Figure 6:
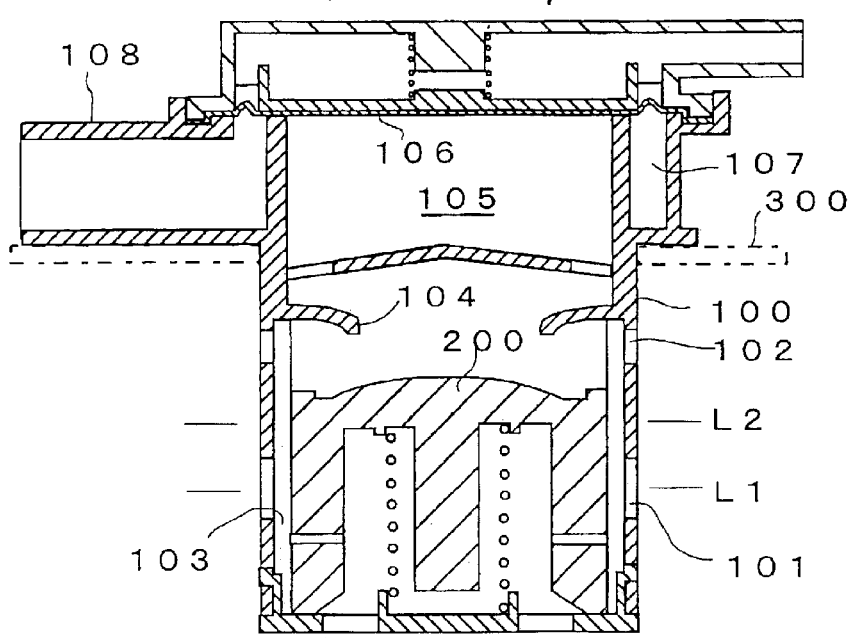
FIG. 6 is a cross-sectional view of a conventional flow-out fuel inhibitor apparatus.

A cylinder-shaped dam 34 is disposed on the top surface of the upper case 3 around the evaporator opening 31. The dam 34 has an inside diameter substantially equal to the inside diameter of the upper case 3, and is build upward in an upright position. As illustrated in FIG. 5, most of the dam 34 is formed as a cylinder shape. However, the dam 34 is bent inward at a portion of the peripheral wall where it faces the nipple 10. Specifically, the peripheral wall of the dam 34 is bent inward so that it approaches the evaporator opening 31 at the portion of the dam 34 which faces the nipple 10. Accordingly, the dam 34 is curved as an arc shape along a part of the outer periphery of evaporator opening 31, and is re-bent outward. Thus, a dent 35 is formed at the portion of the dam 34 which faces the nipple 10. Note that, in Example Nos. 1 and 2, the top surface of the upper case 3 is formed so that it has the maximum height at the central portion with the evaporator opening 31 provided and has a reducing height as it extends to the outer periphery. On the contrarily, in Example No. 3, the top surface of the upper case 3 is formed so that it has the minimum height at the central portion with the evaporator opening 31 provided. Except these arrangements, the upper case 3 in Example No. 3 is formed as the same shape as those of the upper cases 3 in Example Nos. 1 and 2.

In the flow-out fuel inhibitor apparatus according to Example No. 3, the liquid gasoline spouting through the evaporator opening 31 collides with the cover 1 to fall in the dam 34. Accordingly, it is possible to inhibit the liquid gasoline from coming into the nipple 10. Moreover, the liquid gasoline fallen in the dam 34 is reserved in the dam 34. Then, the reserved liquid gasoline flows toward the central portion of the upper case 3 with the evaporator opening 31 provided, because the top surface of the upper case 3 has the maximum height at the outer periphery and has a reducing height as it comes to the central portion. Consequently, the liquid gasoline flows toward the central portion. Thus, the liquid gasoline eventually returns back into the gasoline tank 100 through the evaporator opening 31 when the evaporator opening 31 is not closed by the valve seat 8 of the double-floating valve 5.

Therefore, even when the liquid gasoline is spouted through the evaporator opening 31 in such a volume that exceeds the capacity of the dam 34, it is possible to prevent the drawback that the liquid gasoline overflows out of the dam 34 to flow into the canister. Moreover, it is possible to inhibit the ventilation resistance resulting from forming of the dam 34 from increasing, because the dam 34 is provided with the dent 35 which faces the nipple 10.

Having now fully described the present invention, it will be apparent to one of ordinary skill in the art that many changes and modifications can be made thereto without departing from the spirit or scope of the present invention as set forth herein including the appended claims.

What is claimed is:

1. An apparatus for inhibiting fuels from flowing out of fuel tanks, the apparatus comprising:

a housing fixed to a top of a fuel tank, and having an evaporator opening at a top thereof and a fuel opening at a bottom thereof, the evaporator opening communicating with a canister, the fuel opening enabling a liquid fuel held in the fuel tank to enter the housing;

a double-floating valve accommodated in the housing, and comprising a lower float, an upper float and a ring-shaped valve seat, the lower float floating on the liquid fuel and moving up and down in accordance with up-and-down movements of a level of the liquid fuel, the upper float held on a top surface of the lower float so as to be movable up and down relatively with respect to the lower float and having a minor-diameter valve hole opened or closed by the lower float, the valve seat held to a top surface of the upper float and opening or closing the evaporator opening by the up-and-down movements of the upper float accompanied by the up-and-down movements of the lower float; and a cover disposed above the evaporator opening, covering the housing, communicating with the canister, and having a cylinder-shaped liquid receptacle disposed on an inner surface of the cover facing the evaporator opening, protruding toward the evaporator opening and having a diameter larger than an inside diameter of the valve hole, whereby detecting that the fuel tank is filled up with the liquid fuel by increasing a gas pressure within the fuel tank when the level of the liquid fuel within the fuel tank fully closes the fuel opening, and closing the evaporator opening with the valve sheet by moving the double-floating valve upward when the level of the liquid fuel rises abnormally.

2. The apparatus set forth in claim 1, wherein the evaporator opening, the valve hole and the cylinder-shaped liquid receptacle are disposed coaxially.

3. The apparatus set forth in claim 1, wherein the housing further has a cylinder-shaped liquid reservoir at a top thereof, the liquid reservoir opened under the cylinder-shaped liquid receptacle and communicating with the evaporator opening.

4. The apparatus set forth in claim 1, wherein the housing further has a cylinder which extends downward and whose bottom-end opening forms the fuel opening.

5. An apparatus for inhibiting fuels from flowing out of fuel tanks, the apparatus comprising:

a housing fixed to a top of a fuel tank, and having an evaporator opening at a top thereof, a fuel opening at a bottom thereof and a substantially cylinder-shaped dam, the evaporator opening communicating with a canister, the fuel opening enabling a liquid fuel held in the fuel tank to enter the housing, the cylinder-shaped dam disposed on a top surface of the housing around the evaporator opening and built upward in an upright position;

a double-floating valve accommodated in the housing, and comprising a lower float, an upper float and a ring-shaped valve seat, the lower float floating on the liquid fuel and moving up and down in accordance with up-and-down movements of a level of the liquid fuel, the upper float held on a top surface of the lower float so as to be movable up and down relatively with respect to the lower float and having a minor-diameter valve hole opened or closed by the lower float, the valve seat held to a top surface of the upper float and opening or closing the evaporator opening by the up-and-down movements of the upper float accompanied by the up-and-down movements of the lower float; and a cover disposed above the evaporator opening, covering the housing, and communicating with the canister, whereby detecting that the fuel tank is filled up with the liquid fuel by increasing a gas pressure within the fuel tank when the level of the liquid fuel within the fuel tank fully closes the fuel opening, and closing the evaporator opening with the valve sheet by moving the double-floating valve upward when the level of the liquid fuel rises abnormally.

6. The apparatus set forth in claim 5, wherein a top surface of the housing tapers from wide to narrow in the direction toward the evaporator opening inside the dam.

7. The apparatus set forth in claim 5, wherein the housing further has a cylinder which extends downward and whose bottom-end opening forms the fuel opening.

* * * * *